2,985,136
PROCESS OF TREATING WOOL ON GROWING SHEEP

Roland Joseph Fitzgerald, No. 8 Jetty Circular Quay, Sydney, New South Wales, Australia No Drawing. Filed Jan. 26, 1959, Ser. No. 788,778

2 Claims. (Cl. 119—1)

The present invention relates to a method of and a preparation for treating wool while growing on the sheep to provide wool which when shorn is of improved condition and appearance.

The principal object of the invention is to provide a harmless and economical method of treatment and a preparation which will ensure that wool when shorn is free from excess wool waxes, dirt and unpleasant odours and which will, furthermore, assist in avoiding the disadvantages that occur (a) during the period of growth of the wool, (b) at the time of shearing, (c) in packing and transportation and (d) when the wool is being sold, due to the presence of excess wool waxes, dirt and odours.

A further object of the invention is to provide a method of treatment for use during the wool growing period by means of which the treatment of the wool after shearing, by scouring, is made both easier and cheaper.

The invention consists in a method of treating wool while growing on a sheep which comprises applying to the fleece of a sheep by immersion in a bath or otherwise a preparation composed of soap, sodium or potassium silicate and water compounded to form a liquid which is capable of adhering to the wool fibres of the fleece to form a coating thereon, and allowing the coating formed to dry, said coating being soluble in water and thereby acting to remove harmlessly excess yolk, wool wax and dirt from the wool on the subsequent application of rain or water.

The method is preferably carried out by swimming the sheep through a dip containing the preparation defined above.

The invention further consists in a preparation for the treatment of wool while growing on a sheep composed principally of soap, dosium or potassium silicate and water compounded to form a cream which is easily and rapidly miscible with water.

The preparation used for the treatment of the sheep is preferably prepared as follows. 160 lbs. of anhydrous soap are heated together with nine gallons of water until the water is absorbed by the soap. The temperature of the mass is then allowed to fall to between 160° and 120° F. when 100 lbs. of sodium or potassium silicate is plodded or stirred into it. This prevents "bleeding" and hastens drying.

The mixture is then allowed to settle and dry, after which it is mixed with water in the proportion of between 4 lbs. and ½ lb. to one gallon of water which is heated and stirred. This results in the production of a cream which is used in the manner described below. The proportion of the silicate-soap mixture and the water are chosen to produce a cream of the desired consistency. The preparation is at this stage in a concentrated form which is instantaneously miscible with water, in which it may be transported easily in drums or similar containers.

The proportions of the ingredients may be varied to obtain a preparation of the desired consistency. Experience has shown that the most satisfactory ranges of proportions are as follows:

| | | |
|---|---|---|
| Soap | lbs. | 140–190 |
| Silicate | lbs. | 80–120 |
| Water | gallons | 7–12 |

It will be appreciated, however, that the characteristics of the raw materials may vary to an extent which necessitates the use of proportions outside the preferred range. The aim in compounding the preparation in concentrated form is to obtain a product which is highly concentrated and also very easily miscible with water. These requirements are best met when the preparation is in the form of a thick cream.

For use one part by volume of the preparation is diluted with 20 parts of water to form a liquid which is used to fill a sheep dip. This should be preferably about 20 yards long so that it will take a sheep ½ to ¾ of a minute to swim from one end to the other. The action of swimming assists in ensuring adequate penetration of the liquid throughout the fleece.

Sheep are passed through the dip in the usual manner and in so doing the fleece is cleansed of excess yolk and dirt. On emerging from the dip the wool fibres carry with them a coat of the material in the dip which dries on the fibres. The dip is entirely harmless to the length or breadth of the fibres, their tensile strength, elasticity or crimp, nor does it have any effect on the skin or mucous membranes of the animal treated or on the operator. It also does not instil fear into the sheep prior to dipping by any characteristic smell.

While the treatment removes excess yolk and wool wax, it leaves in the fibres the essential wax which enables the wool to stand up and not felt.

After dipping the sheep are turned out with the dried coating of material on the fleece and yolk, wool wax and dirt thereafter accumulate on the coated wool fibres. The dried coating is however soluble in water and on each occasion that rain falls or water is applied to the sheep from a hose, a part of the coating is dissolved and excess yolk is emulsified and carried away by the water, together with any dirt that may have collected on the fleece.

Tests have shown that by means of a single treatment, for example, two months after shearing, the fleece of treated sheep when next shorn contains a greatly reduced proportion of yolk, wool wax and dirt than is normally the case. It has been found that all parts of a treated fleece yielded 85% of wool as against a normal 65% for fleece wool, 55% for dirty backs and 35% for locks. Treated fleeces were soft and extremely bright in appearance and of uniform colour.

The application of the treatment has the effect of making the scouring process carried out after shearing considerably simpler and less costly. Normal scouring processes involve the use of considerable quantities of wash water and alkaline solutions heated to at least 120° F. and the subjection of the wool to heavy squeeze rollers. In the case of wool that has been treated according to the invention however, approximately 85% of the dirt and yolk will have been removed prior to shearing, most of the remaining 15% may be removed by rinsing in cold water or a very weak soda ash solution. The use of the latter helps to improve the colour of the wool. The resulting reduction in scouring costs can be readily appreciated. The method according to the invention may in fact be considered as being a form of scouring process which is carried out before shearing, thereby facilitating treatment of the wool after shearing. Where a greasy wool particularly resistant to wind and rain is required, wool treated on the sheep according to the invention may be used without further scouring after shearing.

The results given above will not necessarily be achieved in every case with a single treatment as the effectiveness of the treatment will depend to some extent on the climatic conditions experienced. It may in some cases be found advantageous to give a second treatment either with a similar solution to that used initially or a more dilute solution.

Apart from improving the quality of the shorn wool, the treatment does incidentally also help in maintaining the sheep free from pests and parasites such as blow flies by removing the layer of dirt in which they breed and the odour which attracts them. It also reduces the unnecessary load of yolk and dirt normally carried by a sheep by about 2 lbs. It is essential that sheep should be contamination free before treatment as the process does not act in any way to kill parasites and pests already on the sheep.

The particular preparation described above is given by way of example only and its composition may be varied within the scope of the invention as defined broadly above. While it is preferred to apply the preparation by means of a dip as described, it may be applied in other ways, such as spraying.

What I claim is:

1. A process for treating fleece wool while growing on a sheep, comprising the steps of treating fleece wool while on a sheep at least once during the wool growing period and prior to shearing with a quantity of a water soluble film-forming liquid preparation, leaving the liquid to dry on the wool fibres of the fleece to form a water soluble emulsion-forming coating on the fibres, allowing yolk, wool wax and dirt subsequently to accumulate on the coated fibres, then exposing the coated fibres of the fleece while still on the sheep to a shower of water and removing the coating together with accumulated emulsified yolk, wool wax and dirt prior to shearing of the fleece.

2. A process for treating fleece wool while growing on a sheep, comprising the steps of treating fleece wool while on a sheep at least once during the wool growing period and prior to shearing with a quantity of a water soluble film-forming liquid preparation, leaving the liquid to dry on the wool fibres of the fleece to form a water soluble emulsion-forming coating on the fibres, allowing yolk, wool wax and dirt subsequently to accumulate on the coated fibres, then exposing the coated fibres of the fleece while still on the sheep to a succession of showers of water to remove the coating together with accumulated emulsified yolk, wool wax and dirt, again treating the fleece wool while still on the sheep with another quantity of a water soluble film-forming liquid preparation, leaving the newly applied liquid preparation to dry on the wool fibres of the fleece to form another water soluble emulsion-forming coating on the fibres, allowing more yolk, wool wax and dirt to accumulate on the other coating, exposing the fleece while still on the sheep to at least another shower of water and removing all of said other coating and all of the newly accumulated yolk, wool wax and dirt in emulsified condition from the fleece prior to shearing.

References Cited in the file of this patent

UNITED STATES PATENTS

| | | |
|---|---|---|
| 1,033,986 | Clark | July 30, 1912 |
| 1,152,910 | Roberson | Sept. 7, 1915 |
| 2,673,841 | Reinhard | Mar. 30, 1954 |
| 2,776,943 | Eaton | Jan. 8, 1957 |